United States Patent
Hunsche et al.

(10) Patent No.: US 9,988,951 B2
(45) Date of Patent: Jun. 5, 2018

(54) DOUBLE/TRIPLE-LAYER VALVE GUIDE

(71) Applicant: Bleistahl-Produktions GmbH & Co KG, Wetter/Ruhr (DE)

(72) Inventors: Ingwar Hunsche, Bochum (DE); Christian Blecking, Witten (DE); Ekkehard Kohler, Wetter/Ruhr (DE); Dirk Emde, Ennepetal (DE)

(73) Assignee: Bleistahl-Produktions GmbH & Co KG, Wetter/Ruhr (DE)

( * ) Notice: Subject to any disclaimer, the term of this patent is extended or adjusted under 35 U.S.C. 154(b) by 45 days.

(21) Appl. No.: 15/104,512

(22) PCT Filed: Dec. 16, 2014

(86) PCT No.: PCT/EP2014/077943
§ 371 (c)(1),
(2) Date: Jun. 14, 2016

(87) PCT Pub. No.: WO2015/091467
PCT Pub. Date: Jun. 25, 2015

(65) Prior Publication Data
US 2016/0312668 A1    Oct. 27, 2016

(30) Foreign Application Priority Data
Dec. 18, 2013  (DE) .......... 10 2013 021 059

(51) Int. Cl.
*F01L 3/08*  (2006.01)
*B22F 5/10*  (2006.01)
(Continued)

(52) U.S. Cl.
CPC .......... *F01L 3/08* (2013.01); *B22F 3/03* (2013.01); *B22F 3/11* (2013.01); *B22F 3/26* (2013.01); *B22F 5/10* (2013.01); *B22F 5/106* (2013.01); *B22F 7/062* (2013.01); *B23K 20/129* (2013.01); *C22C 33/0278* (2013.01);
(Continued)

(58) Field of Classification Search
CPC ..... F01L 3/08; F01L 3/085; F01L 3/02; B22F 5/106; B22F 3/03; B22F 5/10; B22F 3/11; B22F 3/26; B22F 7/062
See application file for complete search history.

(56) References Cited

U.S. PATENT DOCUMENTS

| | | | | |
|---|---|---|---|---|
| 4,798,181 A * | 1/1989 | Beer | ............ | F01L 3/08 |
| | | | | 123/188.9 |
| 5,654,106 A * | 8/1997 | Purnell | ............ | B22F 3/26 |
| | | | | 419/27 |

(Continued)

FOREIGN PATENT DOCUMENTS

| | | |
|---|---|---|
| DE | 19606270 A1 | 8/1997 |
| DE | 10343680 A1 | 4/2005 |

*Primary Examiner* — Jacob Amick
(74) *Attorney, Agent, or Firm* — Berliner & Associates

(57) ABSTRACT

The invention relates to a valve guide manufactured by a powder-metallurgical process for combustion engines, said guide comprising a central section, a cam-side end piece, and a duct-side end piece, wherein the central section consists of a first material and the duct-side end piece of a second material, with the second material having a hardness in excess of 70 HRB and the first material having a hardness that is by at least 10 HRB lower than that of the second material.

11 Claims, 1 Drawing Sheet

(51) Int. Cl.
  *F01L 3/02*  (2006.01)
  *B22F 3/11*  (2006.01)
  *B22F 3/26*  (2006.01)
  *B22F 7/06*  (2006.01)
  *C22C 33/02*  (2006.01)
  *C22C 38/00*  (2006.01)
  *B22F 3/03*  (2006.01)
  *B23K 20/12*  (2006.01)
  *C22C 38/04*  (2006.01)
  *C22C 38/20*  (2006.01)
  *C22C 38/60*  (2006.01)

(52) U.S. Cl.
  CPC ............ *C22C 38/00* (2013.01); *C22C 38/008* (2013.01); *C22C 38/04* (2013.01); *C22C 38/20* (2013.01); *C22C 38/60* (2013.01); *F01L 3/02* (2013.01); *B22F 2005/103* (2013.01); *B22F 2301/35* (2013.01); *B22F 2998/10* (2013.01)

(56) References Cited

U.S. PATENT DOCUMENTS 6,125,810 A * 10/2000 Haselkorn ................ F01L 3/02
                      123/188.6
2002/0023518 A1  2/2002 Chikahata et al.

* cited by examiner

DOUBLE/TRIPLE-LAYER VALVE GUIDE

The invention relates to a valve guide manufactured by powder-metallurgical processes, for combustion engines, said guide comprising a central section, an end piece facing the cam, and an end piece facing the duet.

Valve guides for combustion engines are located in the cylinder head and serve the purpose of guiding the oscillating valve in such a way that it has close contact with the valve seat ring and in this way is capable of closing off the gas duct.

Valve guides have been manufactured by powder-metallurgical means for many decades. Porosity due to reasons inherent in the manufacturing process is, inter alia, of special advantage because it causes the pores to fill with oil which enhances the lubrication effect between valve guide and valve stem. Good lubrication between these components is necessary because friction is produced due to the oscillating movement.

Basically, a valve guide mounted in a combustion engine can be subdivided into a center section, a cam-side, and a duct-side end piece. All of these sections are exposed to different ambient conditions and have to fulfill different functions.

For example, the duct-side end piece (particularly in outlet valves) is exposed to high temperatures and for that reason must be temperature resistant as well as noncorrosive and resisting wear.

The center section, which essentially encompasses the middle area of the valve guide, on the one hand serves the purpose of conducting the heat from the duct-side end piece and passing if towards the cylinder head (which is cooled). On the other hand, it must also warrant good lubrication between the guide and the valve stem. Moreover, good workability of the center section must also be ensured so that after the engine builder has finished the machining processes the high dimensional accuracy needed for valve alignment is ensured in the cylinder head.

The cam-side end piece projecting from the cylinder head should also be wear-resistant although due to lower ambient temperatures the impact of wear mechanisms like abrasion and adhesion will be less severe than in the case of the duct-side end piece. Ideally, it is ensured that oil and gas do not exit the cylinder head on the cam side.

Valve guides made of a single material are not capable of satisfying all the functional requirements of the three different sections. While a material of high porosity is, for example, conducive to absorbing oil it is at the same time especially susceptible to corrosion as a result of the existing pores. Such a material could be suitably employed for the middle portion but would be less suited for the duct side. Oil could continue to exit through the pores. Another example is an especially wear resistant material that can only be machined with difficulty which is true for the duct-side material.

A solution to the problem was described in publication GB 780 073 A that proposes to avoid oxidation and corrosion in valve guides manufactured by metallurgical processes. This should be brought about by the provision of a corrosion-resistant metallic shell applied by coating the valve guide or parts of it.

Publication DC 103 43 680 A1 discloses a solution aimed at increasing the tightness of valve guides to oil and gas by the infiltration of the cam-side end with copper.

The above mentioned publications only offer partial solutions for the various requirements the three sections of the valve guide have to satisfy. Moreover, all the measures referred to above involve noninherent valve guide properties. In fact, to bring about the desired effect additional work steps are needed for a corrosion-resistant shell or a copper sleeve to be provided or arranged for on the valve guide.

Consequently, the objective of the underlying invention is to provide a valve guide manufactured by powder-metallurgical processes, said valve guide consisting of sections made of different materials with a view to meeting all the different and special requirements of the respective sections concurrently.

This objective is reached by a valve guide of the kind first mentioned above manufactured by powder-metallurgical processes, wherein the central section consists of a first material and the duet-side end piece of a second material, with the second material having a hardness in excess of 70 HRB and the first material having a hardness that is by at least 10 HRB lower than that of the second material.

Figure 1:
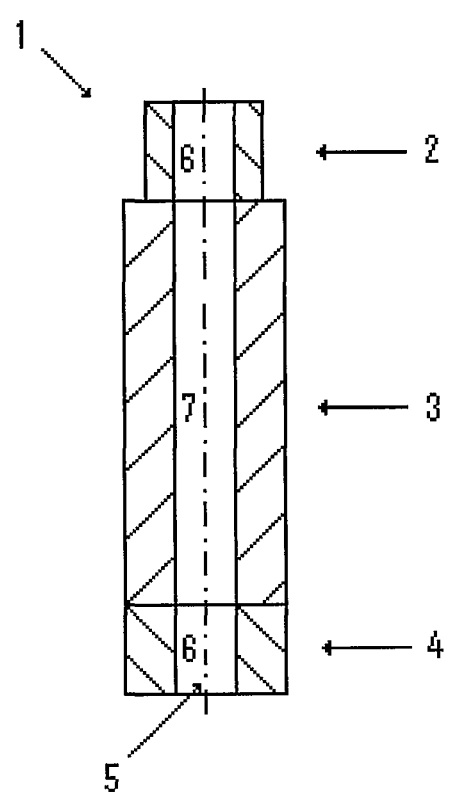
FIG. 1 is a sectional view showing an embodiment of valve guide as proposed by the invention.

The invention offers advantages in that the individual sections of the valve guide are adapted so as to be in accordance with the different (material) requirements.

The cam-side end piece may be manufactured of the first, the second or a third material. Using the first or second material facilitates especially the manufacturing process. The press operation in particular can thus be simplified and shortened. Preferably, also the cam-side end piece consists of the second material.

The materials referred to hereinbefore are for example sintered steel grades having the properties required in each case.

For example, the first material composed of
78 to 88% w/w Fe,
10 to 20% w/w Cu,
0.8 to 1% w/w Mn,
0.4 to 0.6% w/w S and
0.8 to a 2% w/w C The composition is based on an analysis of the sintered material.

Further elements/alloying constituents may exist up to a total amount of 4% w/w.

A concrete composition example of the first material is as follows:
84% w/w Fe,
12% w/w Cu,
0.8% w/w Mn,
0.5% w/w S,
0.9% w/w C
if necessary, further elements/alloying constituents up to 100% w/w,
with the copper content of the first material not including infiltrated copper.

The copper content of at least 10% ensures high thermal conductivity. In this way, the center section is capable of transferring the high temperatures arising at duct-side and valve to the cam-side. The copper is added to the mixture in the form of copper or copper alloy powder before the pressing operation. Sulfur (S) and soft manganese sulfides (MnS) serve as solid lubricants and enhance the emergency operating characteristics of the theological system of guide and stem in the event an insufficient amount of engine oil is available for lubrication. The composition of the first material warrants good machinability.

For example, the second material is composed of
82 to 86% w/w Fe,
1.0 to 1.5% w/w Cr,
12 to 16% w/w Cu,
0.6 to 0.8% w/w Mn,
0.4 to 0.6% w/w S,
0.5 to 2.0% w/w C and
if necessary, further elements/alloying constituents that may amount to up to 3.5% w/w.

The composition is based on an analysis of the sintered material.

A concrete composition example of the second material is as follows:
84% w/w Fe,
1.2% w/w Cr,
12% w/w Cu,
0.7% w/w Mn,
0.5% w/w S,
0.6% w/w C and
if necessary, further elements/alloying constituents up to 100% w/w,
with the copper content of the second material not including infiltrated copper.

A difference in comparison to the first material is the chromium content which results in higher wear resistance due to the formation of chromium carbides.

Moreover, the second material is capable of withstanding high temperatures over a long period of time. Due to the higher temperatures it is exposed to the duct-side end piece, as a rule, is prone to suffer more severe wear than the cam side. For that reason, the second material is characterized by excellent wear resistance.

As wear mechanisms in valve guiding components for combustion engines adhesion and abrasion are frequently encountered. These arise between valve guide and valve stem and are found to be more pronounced on the duct side than on the cam side. Major problems with wear are experienced in outlet valve guide systems. These may lead to the gap width/clearance between valve guide and valve stem to increase allowing particles to enter the sliding area which may ultimately cause valve stem jamming and, as a consequence, motor failure. Therefore, the copper content of the second material contributes additionally to improving the mechanical properties such as hardness and strength.

The first and the second materials differ with respect to hardness, wherein the lower hardness of the first material of the center section in comparison to the second material of the duct-side end piece warrants good machinability whereas the harder material of the duct-side end piece greatly enhances the wear resistance as well as temperature resistance.

Typical thermal conductivity of the center section of valve guides manufactured by powder metallurgical processes ranges between 21 and 48 W/(mK).

In comparison to other valve guide systems (e.g. of cast design) powder-metallurgically manufactured valve guides offer advantages in that they possess pores that can absorb a certain amount of oil. A higher oil content leads to improving the lubrication efficiency of the valve guide. In view of the constant friction arising between valve guide and valve stem this is to be considered a significant benefit.

The density of powder-metallurgically manufactured valve guides on Fe basis is in the range of between 6.5 and 7 g/cm$^3$. This results in a porosity of approx. 10 to 20%. Since the center section requires high porosity the porosity for the first material ranges between 15 and 20% and preferably between 17 and 20%. The porosity of the center section is associated with the oil absorption capability and has an impact on the tribological characteristics.

In an embodiment of the invention, the powder-metallurgically produced valve guide may additionally be provided with copper infiltration applied to the cam side. Preferably, infiltration shall take place on the outsides and/or front side of the cam-side end piece. This increases the tightness to oil and gas and additionally reduces the consumption of engine oil which is detrimental to the environment. The copper infiltration reaches into the area extending maximally from the outer surface down to the center of the wall of the cam-side end piece, however preferably into the area of the surface layer zone which has a thickness of one to three millimeters.

Manufacture of the inventive valve guide may take place in five steps. In a first step, the powder for the duct-side end piece composed of the second material is filled into a die arranged coaxially to a punch and, if expedient, precompacted by means of a pressing tool, in a second step the powder for the center section consisting of the first material is to be filled into the die and, if appropriate, precompacted by means of the pressing tool, in a third step the powder for the cam-side end piece consisting of the second or a third material is to be filled into the die and, if expedient, precompacted by means of the pressing tool, in a fourth step the entire valve guide is compacted in the die using the pressing tool, wherein the form of the compact is particularly determined by the form of the die and of the punch, and in a filth step the entire valve guide is sintered. However, the compaction sequence of the valve guide sections may also be reversed so that at first the duct-side end piece, then the center section, and lastly the cam-side end piece are compacted. It goes without saying that a work step may be omitted in the event the center section and the cam-side end piece are composed of the same material. Moreover, the cam-side end piece may as well be manufactured of a third material. The individual compaction steps may be merged into a single step so that the intermediate compaction steps can be omitted.

Pressing additives, for example wax, can be added to the powder mixture to improve the cohesion of the compact. During the subsequent sintering process the wax will evaporate completely and in this way will no longer be present in the sintered valve guide.

Contrary to methods providing for the valve guides to be manufactured of a single material the present method offers the advantage that density and porosity of the center section can fee well adjusted by means of the pressing operation.

In a special embodiment of the method the compacted valve guide and a copper body may be sintered together, wherein the copper body is in close contact with or resting on the cam-side of the compacted valve guide and with respect to its weight is appropriately adjusted to suit the amount of copper to be infiltrated. Preferably, the copper body is a sleeve. It is to be considered beneficial that the valve guide composed of several materials and the copper body that increases the tightness to oil and gas are joined with each other by means of a single work step—the sintering operation.

The individual elements or sections of the valve guide may also be manufactured separately by a powder metallurgical process and subsequently joined with each other by friction welding.

The FIGURE is a sectional view showing by way of example an embodiment of valve guide 1 as proposed by the invention. The valve guide consists of a cam-side end piece 2, a center section 3, and a duct-side end piece 4. The bore in which the valve stem moves has been given reference numeral 5. In this embodiment the center section consists of a first material 7, and the cam-side and duct-side end piece consist of a second material 6.

The invention claimed is:

1. Valve guide manufactured by powder-metallurgical processes for combustion engines, said guide comprising a central section, an end piece facing the cam, and an end piece facing the duct, characterized in that the central section consists of a first material and the duct-side end piece of a second material, with the second material having a hardness in excess of 70 HRB and the first material having a hardness that is by at least 10 HRB lower than that of the second material.

2. Valve guide according to claim 1, characterized in that the cam-side end piece consists of the first, of the second or of a third material.

3. Valve guide according to claim 1, characterized in that the first material consists of 78 to 88% w/w Fe, 10 to 20% w/w Cu, 0.8 to 1% w/w Mn, 0.4 to 0.6% S, 0.8 to 1% w/w C, and up to 4% w/w of further elements.

4. Valve guide according to claim 1, characterized in that the second material consists of 82 to 86% w/w Fe, 1.1 to 1.3% w/w Cr, 12 to 16% w/w Cu, 0.6 to 0.8% w/w Mn, 0.4 to 0.6% w/w S, 0.5 to 0.7% w/w C, and 0.9 to 1.1% w/w Sn.

5. Valve guide according to claim 1, characterized in that the first material for the center section has a thermal conductivity ranging between 21 and 48 W/(mK).

6. Valve guide according to claim 1, characterized in that the first material has a porosity ranging between 10 and 20%.

7. Valve guide according to claim 1, characterized by a copper infiltration of the outside and/or front side of the cam-side end piece of the valve guide in order to improve the tightness to oil and gas.

8. Valve guide according to claim 7, characterized in that the copper infiltration encompasses the area from the outside to the wall center of the cam-side end piece.

9. Method for the manufacture of a valve guide according to claim 1, characterized in that at first the powders for the individual sections of the valve guide are successively filled into a die which is arranged coaxially with a punch, and following which the entire valve guide in the die is compacted by means of a pressing tool, with the form of the compact being in particular determined by the form of the die and the punch, and with the entire valve guide being sintered in a final work step.

10. Method according to claim 9, characterized in that for at least one of the filling steps a precompaction step is carried out.

11. Method for the manufacture of a valve guide according to claim 1, characterized in that the individual sections of the valve guide are produced in a powder metallurgical way by compaction and sintering and joined by friction welding to form the valve guide.

\* \* \* \* \*